(12) United States Patent
Dryja

(10) Patent No.: US 7,401,833 B2
(45) Date of Patent: Jul. 22, 2008

(54) CARGO BED STEP

(75) Inventor: Richard J. Dryja, Plymouth, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 11/396,782

(22) Filed: Apr. 3, 2006

(65) Prior Publication Data

US 2007/0228761 A1    Oct. 4, 2007

(51) Int. Cl.
 *B62D 25/00*    (2006.01)
(52) U.S. Cl. .......................................... 296/62; 296/61
(58) Field of Classification Search ................... 296/62, 296/57.1; 280/164.1
See application file for complete search history.

(56) References Cited

U.S. PATENT DOCUMENTS

| | | | | |
|---|---|---|---|---|
| 2,809,849 | A * | 10/1957 | Benne | 182/88 |
| 3,462,170 | A * | 8/1969 | Smith et al. | 280/166 |
| 3,756,440 | A * | 9/1973 | Raap et al. | 296/61 |
| 3,961,809 | A * | 6/1976 | Clugston | 296/62 |
| 4,021,071 | A * | 5/1977 | Norman | 296/62 |
| 4,161,997 | A * | 7/1979 | Norman | 296/62 |
| 4,191,388 | A * | 3/1980 | Barksdale | 296/62 |
| 4,194,754 | A * | 3/1980 | Hightower | 280/166 |
| 4,478,549 | A * | 10/1984 | Stelly et al. | 414/537 |
| 4,527,941 | A * | 7/1985 | Archer | 296/61 |
| 4,639,032 | A * | 1/1987 | Barbour | 296/62 |
| 4,846,487 | A * | 7/1989 | Criley | 296/62 |
| 4,848,821 | A * | 7/1989 | Llewellyn | 296/62 |
| 5,028,063 | A * | 7/1991 | Andrews | 296/62 |
| 5,205,603 | A * | 4/1993 | Burdette, Jr. | 296/62 |
| 5,312,150 | A * | 5/1994 | Quam | 296/62 |
| 5,366,052 | A * | 11/1994 | Keh-Lin | 182/88 |
| 5,549,312 | A * | 8/1996 | Garvert | 296/62 |
| 5,617,930 | A * | 4/1997 | Elia | 296/62 |
| 5,732,996 | A * | 3/1998 | Graffy et al. | 296/62 |
| 5,788,311 | A * | 8/1998 | Tibbals | 296/62 |
| 5,816,638 | A * | 10/1998 | Pool, III | 296/62 |
| 5,820,193 | A * | 10/1998 | Straffon | 296/62 |
| 5,988,725 | A | 11/1999 | Cole | |
| 6,116,378 | A * | 9/2000 | Barrow | 296/62 |
| 6,227,593 | B1 * | 5/2001 | De Valcourt | 296/61 |
| 6,270,139 | B1 * | 8/2001 | Simpson | 296/62 |
| 6,340,190 | B1 * | 1/2002 | Rosebrugh et al. | 296/57.1 |
| 6,364,392 | B1 * | 4/2002 | Meinke | 296/62 |
| 6,422,342 | B1 * | 7/2002 | Armstrong et al. | 296/62 |
| 6,454,338 | B1 * | 9/2002 | Glickman et al. | 296/57.1 |
| 6,460,915 | B1 * | 10/2002 | Bedi et al. | 296/183.1 |
| 6,712,568 | B2 * | 3/2004 | Snyder et al. | 410/104 |
| 6,746,066 | B2 * | 6/2004 | Reed | 296/57.1 |
| 6,834,903 | B2 * | 12/2004 | Harper et al. | 296/62 |
| 6,840,526 | B2 * | 1/2005 | Anderson et al. | 280/166 |

(Continued)

*Primary Examiner*—Kiran B. Patel
(74) *Attorney, Agent, or Firm*—Young Basile Hanlon Macfarlane & Helmholdt P.C.

(57) ABSTRACT

A cargo bed step is described including a frame having an upper portion and a lower portion. The frame is disposed proximate a rear portion of a cargo bed. A pivoting mechanism is disposed between an inner surface and the upper portion for selectively pivoting the cargo bed step assembly between a stowed position and an extended position. At least one step is disposed proximate the lower portion. The frame is selectively pivotable to be generally flush with the inner surface of either an inner cargo bed surface or an inner tailgate surface in the stowed position.

6 Claims, 5 Drawing Sheets

U.S. PATENT DOCUMENTS

| | | | |
|---|---|---|---|
| 6,857,680 B2 * | 2/2005 | Fielding | 296/62 |
| 6,905,158 B1 * | 6/2005 | Bastian | 296/62 |
| 6,918,624 B2 * | 7/2005 | Miller et al. | 296/62 |
| 6,942,271 B1 * | 9/2005 | Jamison et al. | 296/61 |
| 6,942,272 B2 * | 9/2005 | Livingston | 296/62 |
| 6,964,444 B2 * | 11/2005 | Chumley et al. | 296/62 |
| 6,966,597 B2 * | 11/2005 | Tegtmeier | 296/62 |
| 6,983,972 B2 | 1/2006 | Tan et al. | |
| 6,988,756 B1 * | 1/2006 | Meinke et al. | 296/50 |
| 6,994,363 B2 * | 2/2006 | Seksaria et al. | 280/166 |
| 7,059,648 B2 * | 6/2006 | Livingston | 296/62 |
| 7,080,713 B1 * | 7/2006 | Riggs | 182/127 |
| 7,090,276 B1 * | 8/2006 | Bruford et al. | 296/62 |
| 7,114,736 B2 * | 10/2006 | Stodola et al. | 280/164.1 |
| 7,168,722 B1 * | 1/2007 | Piotrowski et al. | 280/166 |
| 7,182,380 B2 * | 2/2007 | Nagle | 296/57.1 |
| 2002/0070577 A1 * | 6/2002 | Pool et al. | 296/62 |
| 2002/0121760 A1 * | 9/2002 | Puglisi | 280/163 |
| 2002/0197142 A1 * | 12/2002 | Anderson et al. | 414/557 |
| 2003/0075943 A1 * | 4/2003 | Kirchhoff | 296/26.11 |
| 2005/0117991 A1 * | 6/2005 | Anderson et al. | 410/104 |
| 2005/0275187 A1 * | 12/2005 | Chaudoin et al. | 280/166 |
| 2006/0076794 A1 * | 4/2006 | Bauer | 296/37.6 |

\* cited by examiner

CARGO BED STEP

TECHNICAL FIELD

Described herein is a cargo bed step system for a vehicle, and more particularly, a cargo bed step system for improving step assistance and ramp securement.

BACKGROUND

Heavy and awkward loads are often moved in a cargo bed of a pickup truck. Although pickup trucks are designed to transport such loads, loading and unloading such cargo is sometimes difficult. It is beneficial when loading cargo to have a step at an end of a cargo bed upon which to project the load into the cargo bed. In turn, having an operator in the cargo bed of the vehicle is also beneficial to facilitate loading and unloading the cargo, however, for the operator to get into the cargo bed may be problematic due to its height. Loading cargo such as motorcycles and other recreational vehicles may also be difficult without the use of a ramp. However, ramps typically slip on the tailgate of the pickup truck or may not be safely placed on the edge of the tailgate. Step assists and ramps have been employed in the past to ease loading, operator entry into the cargo bed, and moving heavy cargo up into the cargo bed; however, they have been separate and external cumbersome devices that also aesthetically change the appearance of the vehicle.

It is therefore desired to have a step assist, integrated with respect to the tailgate that could be used to facilitate getting the cargo into the cargo bed and for operator's ease of entry into and from the cargo bed. Furthermore, it is desired to have an integrated ramp-securing mechanism that would allow a user to safely secure a ramp for loading cargo into the cargo bed. It is also desired that the step assist and ramp securing mechanism be simple to use, and not change the appearance of the vehicle. As such, it is desired to have a cargo bed step that not only integrates the step assist and ramp securing mechanism, but is also integrated with respect to the tailgate.

SUMMARY

In the embodiments described, a cargo bed step is employed that includes a frame having an upper portion and a lower portion. The frame is disposed proximate a rear portion of a cargo bed. A pivoting mechanism is disposed between an inner surface if a tailgate and the upper portion for selectively pivoting the cargo bed step assembly between a stowed position and an extended position. At least one step is disposed proximate the lower portion. The frame is selectively pivotable to be generally flush with the inner surface of either an inner cargo bed surface or an inner tailgate surface in the stowed position.

BRIEF DESCRIPTION OF THE DRAWINGS

The features and inventive aspects of the present invention will become more apparent from the following detailed description, the appended claims, and the accompanying drawings, of which the following is a brief description:

DETAILED DESCRIPTION

Figure 1:
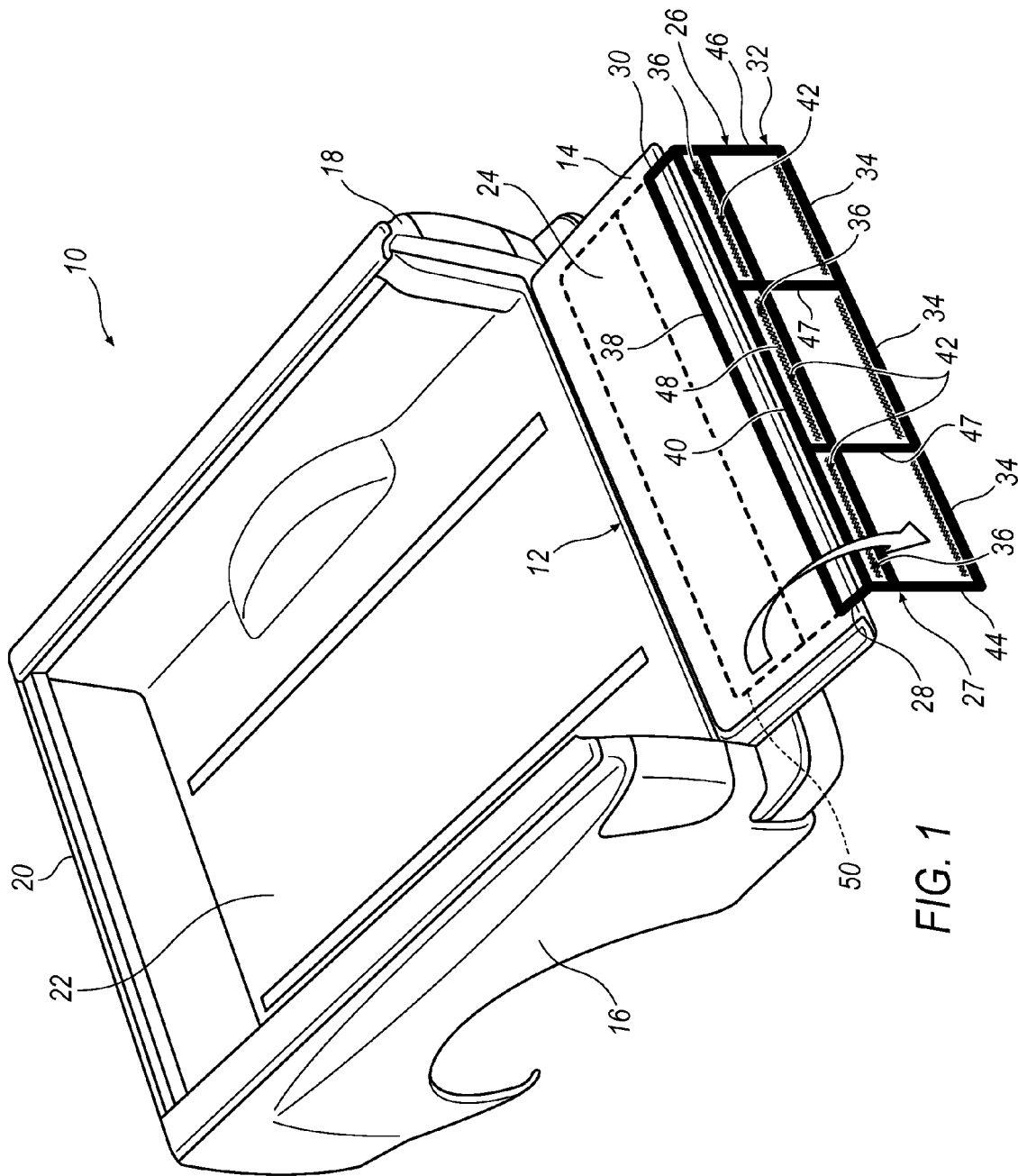
FIG. 1 is an elevated perspective view of an embodiment of a cargo bed step shown in an extended operational orientation.

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting the precise form and configuration shown in the drawings and disclosed in the following detailed description.

The term "step" as used throughout the specification is defined hereinafter to include but is not limited to: a rest for the foot in ascending or descending; and a ledge or an offset. The term "secure" and any variation thereof such as "securement" as used throughout the specification are defined hereinafter to include but are not limited to: to minimize movement; and to fix, hold, capture, or confine. The term "ramp" as used throughout the specification is defined hereinafter to include but is not limited to: at least a partially inclined surface having ends disposed at different levels. The term "proximate" as used throughout the specification is defined hereinafter to include but is not limited to: near or next to; and closely related in space. The term "frame" as used throughout the specification is defined hereinafter to include but is not limited to: something composed of parts fitted and joined together; a structure that give shape or support; and a general structure.

Referring to FIG. 1, one embodiment of a cargo bed 10 of a vehicle (not shown) is illustrated as having a rear portion 12 closable by a pivotally mounted tailgate 14. The cargo bed 10 is enclosed by a left wall portion 16, a right wall portion 18, and a forward wall portion 20. The cargo bed 10 includes a generally planar inner surface 22 interconnecting the wall portions. The tailgate 14 includes a generally planar tailgate inner surface 24. However, the generally planar inner surface 22 of the cargo bed 10 and the generally planar tailgate inner surface 24 may also include ridges, channels, logo designs, and the like providing a surface that is generally planar in the most general sense. In FIG. 1, the tailgate 14 is shown in an open position, where the inner surface 22 of the cargo bed 10 is generally coplanar with the tailgate inner surface 24. The tailgate 14 is secured to the cargo bed 10 by any known securing mechanism (not shown) including latches, hinges, rods, and the like. Further, the tailgate 14 is held in the open position by any known retaining mechanism (not shown) including a pair of supports and the like. The cargo bed 10, tailgate 14, and any portion thereof may be formed from any material including steel, aluminum, plastic, a glass-filled polymer, polyamide resin, and the like. Moreover, in another exemplary embodiment, the exterior portion of the wall portions 16, 18, and 20 and tailgate 14 may be formed from steel and the interior portion of the panels 16, 18, and 20 and tailgate 14 may be formed from plastic or glass-filled polymer.

An extendable cargo bed step assembly 26 is shown in an extended position external to the tailgate 14. The cargo bed step assembly 26 includes a frame 27 having an upper portion 28, including a first surface 30 generally flush or below the tailgate inner surface 24 in the extended position. The cargo bed step assembly 26 further includes a lower portion 32 generally extending downwardly from the upper portion 28 in the extended position, providing at least one step 34 and at least one ramp securement portion 36 for securing at least one ramp 37 to be descried in further detail below in connection with FIG. 6. An innermost edge 38 of the cargo bed step assembly 26 is pivotally connected to the tailgate 14. The cargo bed step assembly 26 is rotatable with respect to the innermost edge 38 between the extended position as shown in FIG. 1 and a stowed position as shown in FIG. 2.

The lower portion 32 of the cargo bed step assembly 26 is pivotally connected to the upper portion 28 at an upper edge 40. The lower portion 32 is rotated to place the lower portion 32 in a downwardly extended and operational orientation. The ramp securement portion 36 is disposed between the upper edge 40 and the step 34. The ramp securement portion 36 may include one longitudinal ramp securement opening 42 or any plurality of ramp securement openings 42 between a left end 44 and a right end 46 of the cargo bed step assembly 26. The left end 44 and the right end 46 are generally perpendicular to the steps 34 and may be tubular, rectangular, and the like. Intermediate support structures 47 orientated generally perpendicular to the steps 34 may be disposed between the left end 44 and the right end 46 to provide additional strength to the cargo bed step assembly 26. A lower surface 48 of the ramp securement portion 36 includes any mechanism for minimizing movement of the ramp in the ramp securement portion 36, including serrated edges, a non-slip surface, mechanical clamps, spikes, and the like. Further, the lower surface 48 may be pivotally mounted to the cargo bed step assembly 26 for accommodating a plurality of ramp angles.

Figure 2:
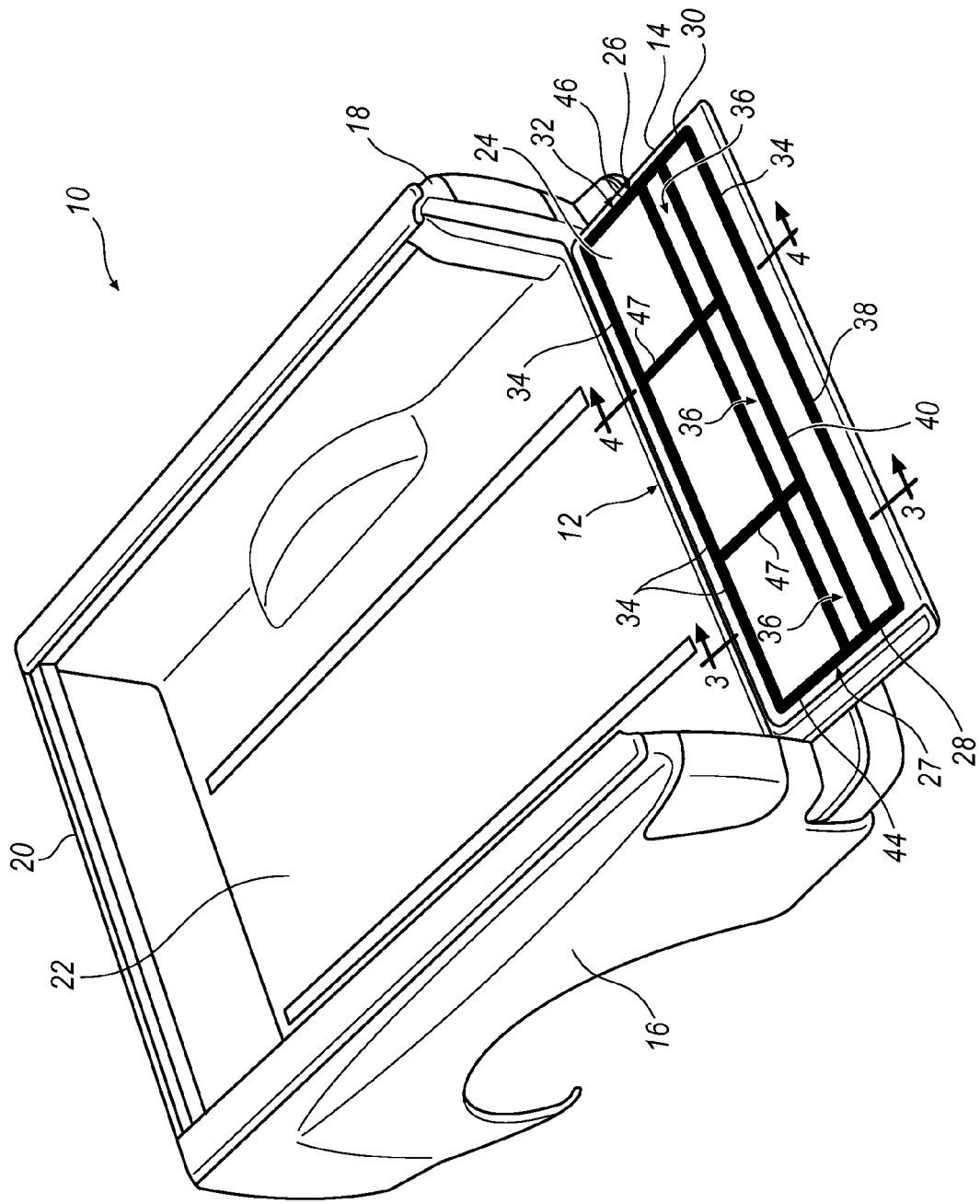
FIG. 2 is an elevated perspective view of the cargo bed step of FIG. 1 in a stowed orientation.
Figure 5:
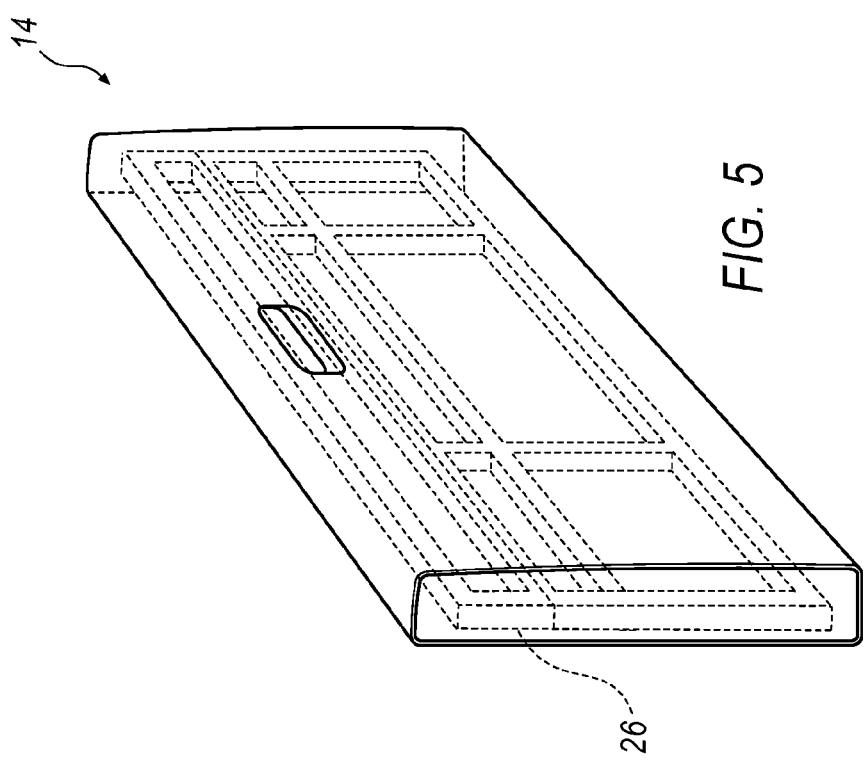
FIG. 5 is an elevated perspective view of a tailgate having an integrated cargo bed step of FIG. 1.
Figure 3:
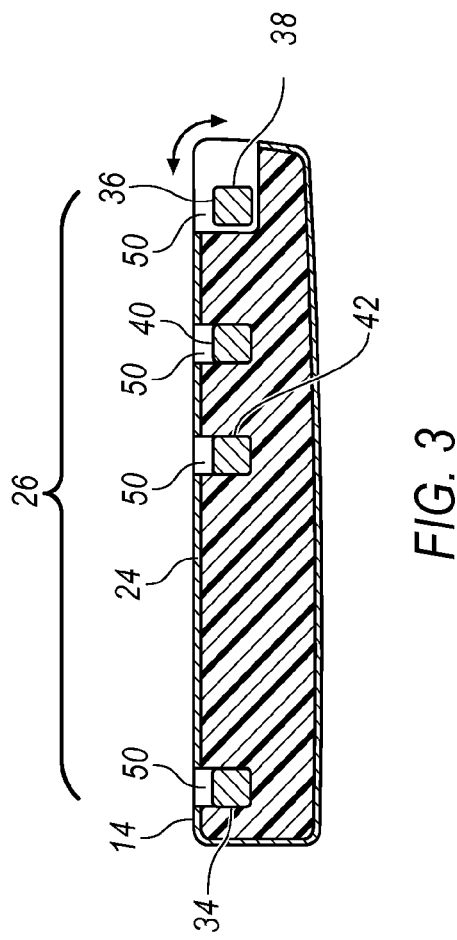
FIG. 3 is a cross-sectional view of the cargo bed step of FIG. 1 taken along sectional line 3-3 in FIG. 2.
Figure 4:
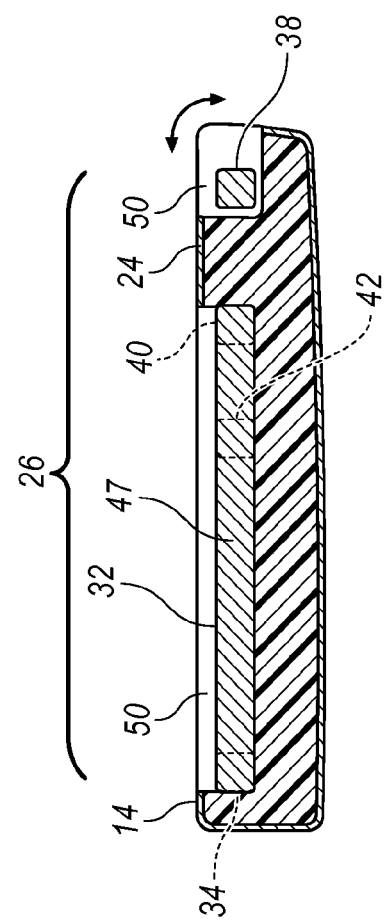
FIG. 4 is a cross-sectional view of the cargo bed step of FIG. 1 taken along sectional line 4-4 in FIG. 2.

FIG. 2 shows the cargo bed step assembly 26 in the stowed position. The cargo bed step assembly 26 is rotated towards the cargo bed 10 until the frame 27 is securely placed into a receiving channel 50 of the tailgate 14. FIG. 3 is a cross-sectional view of the cargo bed step assembly 26 taken along sectional line 3-3 of FIG. 1 and FIG. 4 is a cross-sectional view of the cargo bed step assembly 26 taken along sectional line 4-4 of FIG. 1. The frame 27 is disposed generally coplanar with tailgate inner surface 24 or generally below tailgate inner surface 24. The frame 27 may be secured into the receiving channel 50 by any known mechanism including latches, pins, and frictional tabs (not shown) disposed proximate to the receiving channel 50. The receiving channel 50 includes vertical and horizontal channels that correspond to the shape and depth of the frame 27, as shown in FIGS. 3 and 4. In the closed orientation as shown in FIG. 5, the tailgate 14 rests generally vertically with respect to the cargo bed 10. The cargo bed step assembly 26 is securely disposed within the tailgate 14.

Figure 7:
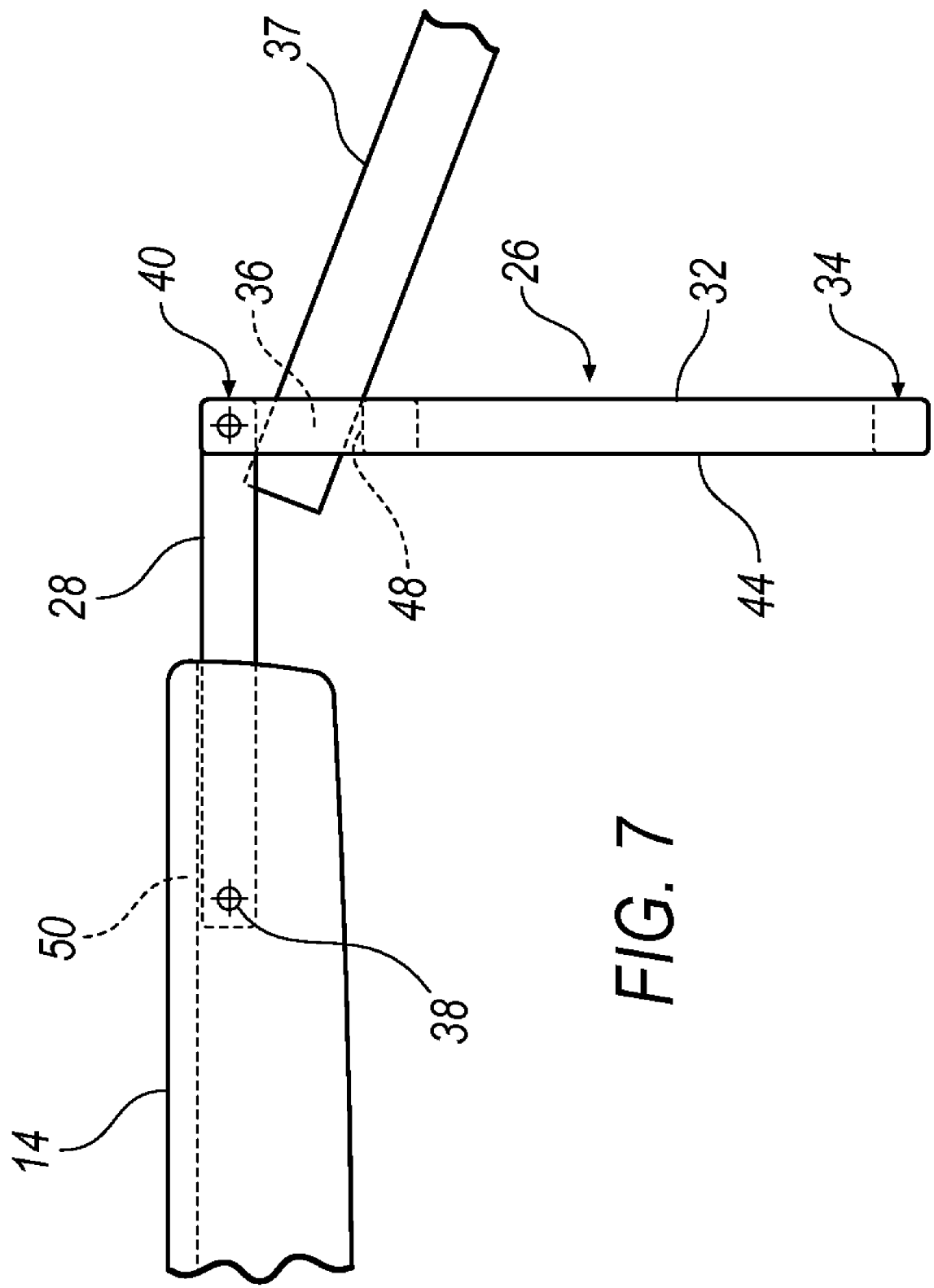
FIG. 7 is a detailed side view of the cargo bed step of FIG. 6 showing a ramp inserted into the ramp securement portion.

In FIG. 7, the cargo bed step assembly 26 is shown in the extended position by being rotated around the innermost edge 30 and having the lower portion extending downwardly. The cargo bed step assembly is secured to the tailgate 14 in the receiving channel 50. The receiving channel 50 provides lateral support for the cargo bed step assembly 26 and at the upper portion 28. The lower portion 32 is pivotally secured to the upper portion 28 at upper edge 40 proving a plurality of possible angles to secure the ramp 37. However, as stated above, the ramp securement portion 36 a lower surface 48 that is also pivotally secured to the lower portion 32 for providing the ramp 37 with an angled support.

Figure 6:
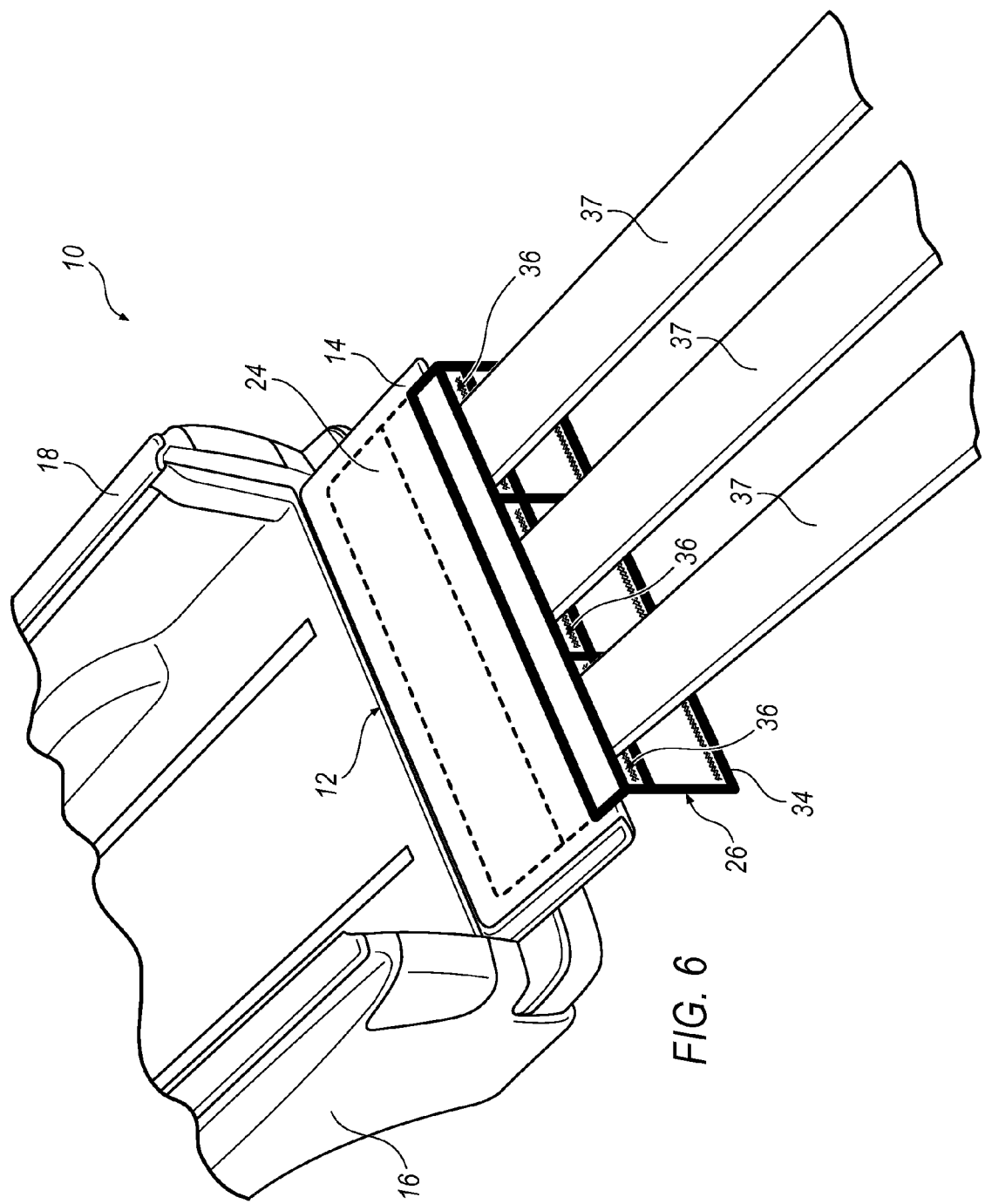
FIG. 6 is an elevated perspective view of the cargo bed step of FIG. 1 showing three ramps inserted into three ramp securement portions.

In operation, the tailgate 14 is opened and the cargo bed step assembly 26 is rotated outwardly from the tailgate 14 about the pivot edge 38 until the lower portion 32 of the frame 27 is disposed in a generally downwardly direction. The user may then climb into the cargo bed 10 by stepping on one of the steps 34. In addition, as shown in FIG. 6, the user may place ramps 37 into the ramp securement portion 36 for assisting in moving heavier cargo and movable cargo into the cargo bed 10.

The cargo bed step assembly 26 is integrated with the tailgate 14 and is used to facilitate getting the cargo into the cargo bed 10 and for a user's ease of entry into and from the cargo bed 10. Furthermore, the integrated ramp securing securement portion 36 allows a user to safely secure the ramp 37 for loading cargo into the cargo bed 10. Moreover, the cargo step assembly does not change the appearance of the vehicle.

The preceding description has been presented only to illustrate and describe exemplary embodiments of the systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. An assembly comprising:
   a tailgate pivotally mounted with respect to a vehicle cargo area, a free end spaced away from a pivot point, and an inner surface selectively disposable proximate the vehicle cargo area;
   the inner surface defining a first plane and having a recess formed therein, proximate the free end of the tailgate; and
   a step assembly configured for selective placement within the recess, the step assembly including an upper member and a lower member;
   the upper member including a first end pivotally mounted within the recess proximate the free end of the tailgate, and a second end pivotally mounted to the lower member;
   the step assembly pivotally displaceable between a first stowed configuration wherein the step assembly is substantially entirely disposed within the recess beneath the first plane defined by the inner surface, and a second extended configuration wherein at least a portion of the upper member of the step assembly extends beyond the free end of the tailgate and at least a portion of the upper member is disposed within the recess generally parallel with the inner surface of the tailgate.

2. The assembly of claim 1, wherein at least a portion of the step assembly is generally flush with the inner surface of the tailgate in the stowed position.

3. The assembly of claim 1, wherein at least a portion of the step assembly is disposed generally below the inner surface of the tailgate in the stowed position.

4. The assembly of claim 1, wherein at least a portion of the lower member of the step assembly extends generally perpendicularly downward with respect to the inner surface of the tailgate.

5. The assembly of claim 1, wherein the recess extends through the free end of the tailgate.

6. The assembly of claim 1, wherein the step assembly extends horizontally across substantially all of the tailgate assembly.

* * * * *